United States Patent [19]
Nagata et al.

[11] Patent Number: 5,427,754
[45] Date of Patent: Jun. 27, 1995

[54] METHOD FOR PRODUCTION OF PLATELIKE HYDROXYAPATITE

[75] Inventors: Fukue Nagata, Nagoya; Yoshiyuki Yokogawa, Komaki; Motohiro Toriyama, Kasugai; Yukari Kawamoto, Nagoya; Takahiro Suzuki, Nagoya; Kaori Nishizawa, Nagoya; Hajime Nagae, Nagoya, all of Japan

[73] Assignees: Agency Of Industrial Science & Technology; Ministry of International Trade & Industry, Tokyo, Japan

[21] Appl. No.: 174,264

[22] Filed: Dec. 28, 1993

[30] Foreign Application Priority Data

Jan. 11, 1993 [JP] Japan ............................ 5-019669

[51] Int. Cl.$^6$ .............................................. C01B 25/32
[52] U.S. Cl. ...................................... 423/308; 423/311
[58] Field of Search ................................. 423/311, 308

[56] References Cited

U.S. PATENT DOCUMENTS 4,481,175 11/1984 Iino et al. ........................ 423/311

OTHER PUBLICATIONS

Journal of the Chemical Society of Japan, 10 M. Yoshimura, et al. 1991 pp. 1402–1407.

Primary Examiner—Wayne Langel
Attorney, Agent, or Firm—Oblon, Spivak, McClelland, Maier & Neustadt

[57] ABSTRACT

A platelike hydroxyapatite is produced by preparing from a phosphate and a calcium salt an aqueous slurry of amorphous calcium phosphate having an atomic ratio of calcium atoms to phosphorus atoms in the range of 1.3:1 to 2.0:1, adding to the aqueous slurry not less than 10% by weight of alcohol based on the amount of the aqueous slurry, and subjecting the resultant mixture to a hydrothermal treatment.

13 Claims, No Drawings

METHOD FOR PRODUCTION OF PLATELIKE HYDROXYAPATITE

BACKGROUND OF THE INVENTION

1. Field of the Invention

This invention relates to improvements in and concerning a method for the production of platelike hydroxyapatite. More particularly, this invention relates to a method for producing with good efficiency a platelike hydroxyapatite grown along its a and b axes, exhibits excellent crystallinity, and serves as a suitable adsorbent for chromatographic devices, for example.

2. Description of the Prior Art

Recent advances in the bioindustry have led to a need for the development of techniques for the separation and purification of biopolymers such as proteins. The hydroxyapatite represented by the chemical formula $Ca_{10}(PO_4)_6OH_2$ possesses an adsorption characteristic specific to proteins. This characteristic can be expected to enable the separation of proteins with high efficiency. This hydroxyapatite is very stable above pH 7. When it is used as an adsorbent in chromatography, therefore, the adsorbent can be cleansed effectively with an alkali. Further, this substance is insoluble in organic solvents. Owing to these outstanding features, the hydroxyapatite has been attracting widespread attention in recent years as an adsorbent useful for chromatographic devices.

The hydroxyapatite for use as an adsorbent for chromatographic devices is produced by preparing primary particles chiefly by a wet process and pelletizing the primary particles into spherical particles measuring approximately 1 to 100 μm in diameter.

The hydroxyapatite particles can be made to acquire different crystal faces. It has been ascertained that the kind of protein adsorbed on the hydroxyapatite varies with the kind of the crystal faces of the hydroxyapatite.

It is, therefore, necessary to produce hydroxyapatite which possesses crystal faces, befitting the particular kind of the protein to be adsorbed.

As concerns the hydroxyapatite, certain reports such as on the manufacture of acicular hydroxyapatite preferentially grown along the c axis as by mixing low-crystallinity apatite with various additives and subjecting the resultant mixture to a hydrothermal treatment (treatment performed by application of heat under saturated vapor pressure) have been reported in the literature (M. Yoshimura, H. Suda, K. Okamoto and K. Ioku, Journal of the Chemical Society of Japan, 10, 1402(1991)).

SUMMARY OF THE INVENTION

The hexagonal platelike hydroxyapatite which is grown preferentially along its a and b axes is held to be a suitable adsorbent for chromatographic devices for isolating biopolymer compounds.

No method has been heretofore developed for producing this hexagonal platelike hydroxyapatite with high efficiency. The present inventors have made a study with a view to developing such a method and, as a result, perfected this invention.

To be specific, this invention relates to a method for the production of a platelike hydroxyapatite which consists essentially of mixing a phosphate, a calcium salt, and water so as to obtain an atomic ratio of calcium atoms to phosphorus atoms in the range of 1.3:1 to 2.0:1 thereby forming an aqueous slurry of amorphous calcium phosphate, then adding to the aqueous slurry at least 10% by weight of alcohol based on the amount of the slurry, treating the resultant mixture by application of heat under saturated vapor pressure, and subjecting the product of the treatment to solid-liquid separation.

DESCRIPTION OF THE PREFERRED EMBODIMENT

This invention will now be described more specifically below. First, an aqueous slurry of amorphous calcium phosphate is prepared from a phosphate and a calcium salt. The phosphate used as one of the starting materials in this case is only required to be capable of reacting with a calcium salt and consequently producing amorphous calcium phosphate. The phosphates which can be advantageously used herein include calcium hydrogen phosphate, dihydrate thereof, and ammonium phosphate, for example. The calcium salt as the other starting material is only required to be capable of reacting with the phosphate mentioned above and consequently forming the amorphous calcium phosphate. Calcium carbonate is particularly preferable as the calcium salt.

The preparation of the aqueous slurry of amorphous calcium phosphate will now be described. The phosphate and the calcium salt weighed out in such respective amounts as to obtain an atomic ratio of calcium atoms to phosphorus atoms in the range of 1.3:1 to 2.0:1, preferably 1.5:1 to 1.8:1, are mixed with such an amount of water as to produce an aqueous slurry having a solids concentration in the approximate range of 1 to 10% by weight. This mixing can be easily carried out by a wet method or a method of agitating in a pot mill.

The aqueous slurry of amorphous calcium phosphate prepared as described above is subjected to a hydrothermal treatment (i.e. a treatment by application of heat under saturated vapor pressure). Prior to this treatment, the aqueous slurry requires addition of an alcohol thereto. The amount of alcohol to be added must be not less than 10% by weight, preferably not less than 30% by weight, based on the amount of the aqueous slurry. The alcohols which can be advantageously used herein include lower aliphatic alcohols such as methanol, ethanol, 1-propanol and glycerol, for example. These alcohols may be used either singly or in the form of a mixture of two or more members.

Then, the aqueous slurry of amorphous calcium phosphate to which the alcohol has been added is placed in a pressure vessel such as an autoclave and subjected to a hydrothermal treatment therein under stirring. This treatment in the pressure vessel is generally carried out at a temperature in the range of 120° to 200° C. for approximately 2 to 20 hours, preferably at a temperature in the range of 150° to 200° C. for approximately 5 to 20 hours. The pressure used for the treatment must be in the range of 1 to 200 kgf/cm$^2$.

After the hydrothermal treatment, the aqueous slurry is removed from the pressure vessel. From this aqueous slurry, fine crystals of platelike hydroxyapatite exhibiting ideal crystallinity are obtained by extracting the solid portion of the aqueous slurry as by filtration or centrifuging the aqueous slurry and drying the extracted solid portion. By observation under a transmission electron microscope, the crystals are found to be approximately hexagonal plates grown along their a and b axes. The size of these crystals varies with the reaction conditions adopted. Generally, it is in the range of approximately 50 to 200 nm.

The platelike hydroxyapatite is useful as an adsorbent for chromatographic devices used for the separation or purification of such biopolymer compounds as proteins.

This invention will now be described more specifically below with reference to working examples.

EXAMPLE 1

An aqueous slurry containing amorphous calcium phosphate at a concentration of 5% by weight was prepared from such amounts of calcium hydrogen phosphate dihydrate and calcium carbonate as to obtain a molar ratio of 3:2 (atomic ratio of calcium atoms to phosphorus atoms 1.67:1). A mixture of 200 ml of the aqueous slurry with 200 ml of methanol (79% by weight based on the amount of slurry) was adjusted to pH 10, placed in an autoclave, and treated therein at 180° C. at a pressure of 14 kgf/cm$^2$ for five hours. The solid portion consequently formed in the aqueous slurry was separated by filtration, dried at 60° C., and crushed.

The product thus obtained was identified by powder X-ray diffraction spectrometry to be hydroxyapatite. By observation under a transmission electron microscope, the hydroxyapatite was found to consist wholly of substantially hexagonally platelike microcrystals measuring about 50 nm in maximum length.

EXAMPLE 2

An aqueous slurry containing amorphous calcium phosphate at a concentration of 5% by weight was prepared from such amounts of calcium hydrogen phosphate dihydrate and calcium carbonate as to obtain a molar ratio of 2:1 (atomic ratio of calcium atoms to phosphorus atoms 1.5:1). A mixture of 250 ml of the aqueous slurry with 75 ml of ethanol (24% by weight based on the amount of slurry) was adjusted to pH 10, placed in an autoclave, and treated therein at 180° C. at a pressure of 13 kgf/cm$^2$ for ten hours. The solid portion consequently formed in the aqueous slurry was separated by filtration, dried at 60° C., and crushed.

The product thus obtained was identified by powder X-ray diffraction spectrometry to be hydroxyapatite. By observation under a transmission electron microscope, the hydroxyapatite was found to consist wholly of substantially hexagonally platelike microcrystals measuring about 100 nm in maximum length.

COMPARATIVE EXPERIMENT 1

The procedure of Example 1 was faithfully repeated, except that the amount of methanol added was changed to 5 ml (2% by weight based on the amount of the slurry).

The powder thus obtained was identified by powder X-ray diffraction spectrometry to be hydroxyapatite. By observation under a transmission electron microscope, the hydroxyapatite was found to consist wholly of rodlike or unsettled microcrystals measuring about 100 nm in size.

COMPARATIVE EXPERIMENT 2

The procedure of Example 2 was repeated, except that the molar ratio of calcium hydrogen phosphate dihydride to calcium carbonate was changed to 5:1.

The powder thus obtained was identified by powder X-ray diffraction spectrometry to be hydroxyapatite. By observation under a transmission electron microscope, the hydroxyapatite was found to consist wholly of rodlike or needlelike microcrystals measuring about 100 nm in size.

EXAMPLES 3 TO 7 AND COMPARATIVE EXPERIMENTS 3 TO 7

Various types of hydroxyapatite were produced by following the procedure of Example 1, except that the kinds of phosphate salt, the atomic ratio of the phosphate and calcium salts, the concentration of the aqueous slurry, the kind and amount of alcohol, and the conditions of the hydrothermal treatment were varied as shown in Table 1. Table 1 also shows the properties of the different types of hydroxyapatite obtained.

The data for the working examples and comparative experiments shown above clearly demonstrate that only by the method of this invention was there obtained hexagonally platelike hydroxyapatite grown preferentially along the a and b axes and possessed of excellent properties particularly fit for use as an adsorbent for chromatographic devices.

TABLE 1

| No. | Example 3 | Example 4 | Example 5 | Example 6 | Example 7 | Comparative Experiment 3 | Comparative Experiment 4 | Comparative Experiment 5 | Comparative Experiment 6 | Comparative Experiment 7 |
|---|---|---|---|---|---|---|---|---|---|---|
| Phosphate | | | | | | | | | | |
| Calcium hydrogen phosphate (mol) | 3 | | | 3 | | 3 | | | 3 | |
| Calcium hydrogen phosphate dihydrate (mol) | | 3 | | | 3 | | 3 | | | 3 |
| Ammonium phosphate (mol) | | | 3 | | | | | 3 | | |
| Calcium salt | | | | | | | | | | |
| Calcium carbonate (mol) | 2 | 2 | 4 | 2 | 2 | 2 | 2 | 4 | 2 | 2 |
| Ammonium phosphate (mol) | | | 3 | | | | | 3 | | |
| Calcium atoms/phosphorus atoms | 1.67 | 1.67 | 1.33 | 1.67 | 1.67 | 1.67 | 1.67 | 1.33 | 1.67 | 1.67 |
| Aqueous slurry | | | | | | | | | | |
| Amount formed (g) | 200 | 200 | 200 | 200 | 100 | 200 | 200 | 200 | 200 | 10 |
| Concentration (%) | 5 | 5 | 5 | 1 | 1 | 5 | 5 | 5 | 1 | 90 |
| Alcohol | | | | | | | | | | |
| Kind | IP | G | G | E | M | IP | M | M | E | M |
| Amount added (g) | 200 | 20 | 100 | 200 | 200 | 5 | 10 | 15 | 200 | 200 |
| Ratio, % by weight, based on amount of slurry | 100 | 10 | 50 | 100 | 200 | 2.5 | 5 | 7.5 | 100 | 2000 |
| Treatment in autoclave | | | | | | | | | | |
| pH | 10 | 10 | 10 | 10 | 10 | 10 | 10 | 10 | 10 | 10 |
| Amount charged (g) | 400 | 220 | 250 | 400 | 210 | 205 | 210 | 215 | 400 | 210 |
| Pressure (kgf/cm$^2$) | 10 | 10 | 10 | 22 | 22 | 10 | 11 | 11 | 22 | 25 |
| Temperature (°C.) | 180 | 180 | 180 | 200 | 180 | 180 | 180 | 180 | 200 | 180 |

TABLE 1-continued

| No. | Example | | | | | Comparative Experiment | | | | |
| --- | --- | --- | --- | --- | --- | --- | --- | --- | --- | --- |
| | 3 | 4 | 5 | 6 | 7 | 3 | 4 | 5 | 6 | 7 |
| Duration (hours) | 20 | 5 | 10 | 20 | 10 | 20 | 5 | 10 | 0.5 | 10 |
| Hydroxyapatite | | | | | | | | | | |
| Kind | P | P | P | P | P | R.G. | R.G. | R | B | B |
| Shape | H | | | H | H | | | | | |
| Size (maximum diameter) (nm) | 100 | 200 | 200 | 200 | 50 | 100 | 100 | 100 | | |

1P: 1-propanol G: Glycerol E: Ethanol M: Methanol P: Plate R.G.: Rod or Grain H: Hexagonal B: Insufficient crystallization

What is claimed is:

1. A method for the production of a platelike hexagonal hydroxyapatite grown along its a and b axes, which comprises the steps of:
   mixing a phosphate, a calcium salt and water so as to obtain an atomic ratio of calcium atoms to phosphorus atoms in the ratio of 1.3:1 to 2.0:1, thereby forming an aqueous slurry of amorphous calcium phosphate;
   adding to said aqueous slurry at least 10% by weight of alcohol based on an amount of said slurry to obtain a mixture;
   treating said mixture in a pressure vessel at a pressure of 1–200 kgf/cm$^2$ by application of heat under saturated vapor pressure to obtain said hydroxyapatite; and then
   subjecting said hydroxyapatite to solid-liquid separation.

2. A method according to claim 1, wherein said phosphate is at least one member selected from the group consisting of calcium hydrogen phosphate, calcium hydrogen phosphate dihydrate, and ammonium phosphate.

3. A method according to claim 1, wherein said calcium salt is calcium carbonate.

4. A method according to claim 1, wherein said phosphate and said calcium salt are mixed so that the atomic ratio of calcium atoms to phosphorus atoms in said phosphate and calcium salt is in the range of 1.5:1 to 1.8:1.

5. A method according to claim 1, wherein the temperature of said treatment is in the range of 120° to 200° C.

6. A method according to claim 1, wherein the concentration of said amorphous calcium phosphate in said aqueous slurry is in the range of 1 to 10% by weight.

7. A method according to claim 1, wherein said alcohol is at least one member selected from the group consisting of methanol, ethanol, 1-propanol and glycerol.

8. A method according to claim 5, wherein the pressure of said treating step is at least 10 kgf/cm$^2$.

9. A method according to claim 8, wherein the pressure of said treating step is 10–22 kgf/cm$^2$.

10. A method according to claim 7, wherein said alcohol is at least one member selected from the group consisting of methanol and ethanol.

11. A method according to claim 1, wherein not less than 30% by weight of said alcohol is added to said aqueous slurry.

12. A method according to claim 1, wherein said heat is applied for approximately 2–20 hours.

13. A method as claimed in claim 12, wherein said heat is applied for approximately 5–20 hours.

* * * * *